United States Patent [19]

Chen

[11] Patent Number: 4,873,594

[45] Date of Patent: Oct. 10, 1989

[54] DISK SPACER RING HAVING AIR PUMPS

[75] Inventor: Tsu-Fang Chen, Eden Prairie, Minn.

[73] Assignee: Magnetic Peripherals Inc., Minnetonka, Minn.

[21] Appl. No.: 182,675

[22] Filed: Apr. 18, 1988

[51] Int. Cl.$^4$ .......................... G11B 5/02; G11B 23/00
[52] U.S. Cl. .............................. 360/97.03; 360/98.08; 360/133
[58] Field of Search ............... 360/97.03, 97.02, 97.01, 360/98.02, 98.08, 98.01, 99.05, 99.12, 133

[56] References Cited

U.S. PATENT DOCUMENTS 4,538,192  8/1985  White et al. ...................... 360/97.03
4,562,499 12/1985  Mizoshita .......................... 360/97.03

Primary Examiner—John H. Wolff
Assistant Examiner—Matthew J. Bussan
Attorney, Agent, or Firm—Edward P. Heller, III

[57] ABSTRACT

A disk pack spacer ring has formed thereon a plurality of pairs of intercommunicating scoop/pump channels which prevent formation of solid body rotation of air between closely spaced disk surfaces so that the entire space between the disk surfaces is ventilated. A scoop channel angled into the direction of rotation scoops air into the channel, and a intercommunicating pump channel angled away from the direction of rotation pumps the scooped air out in a direction opposite to disk rotation. In one embodiment, the scoop and pump channels are disposed on upper and lower surfaces of the ring and a flow through channel disposed on the inner surface of the ring connects the two.

6 Claims, 6 Drawing Sheets

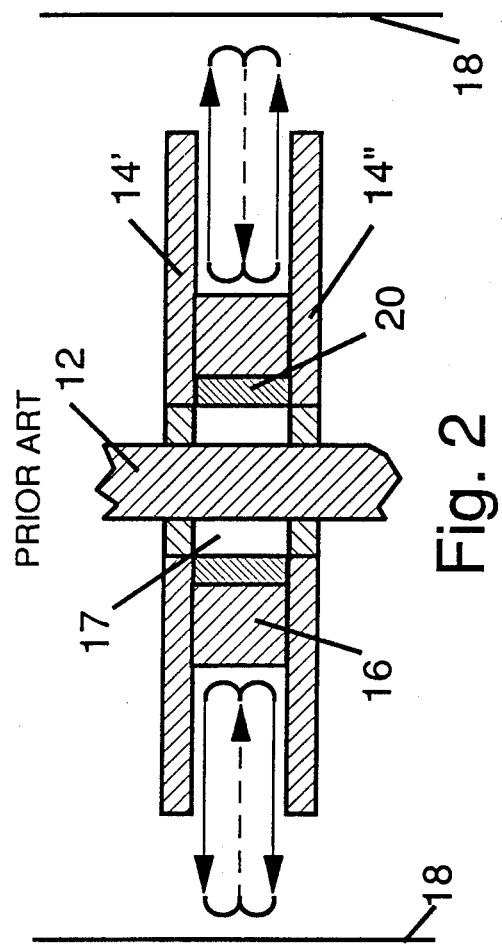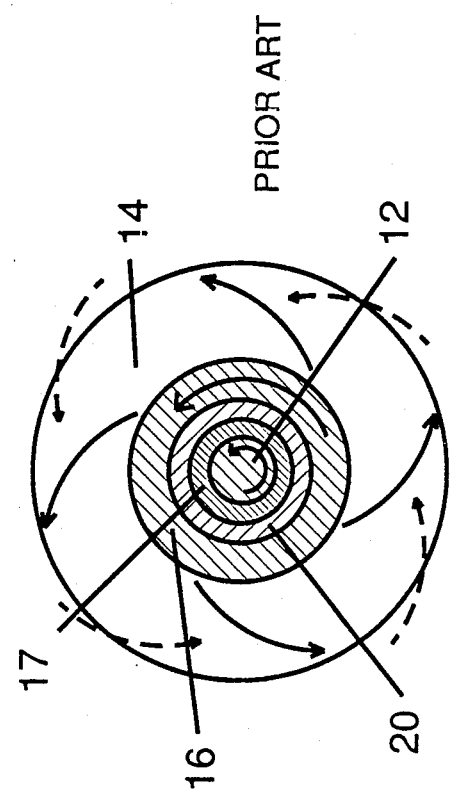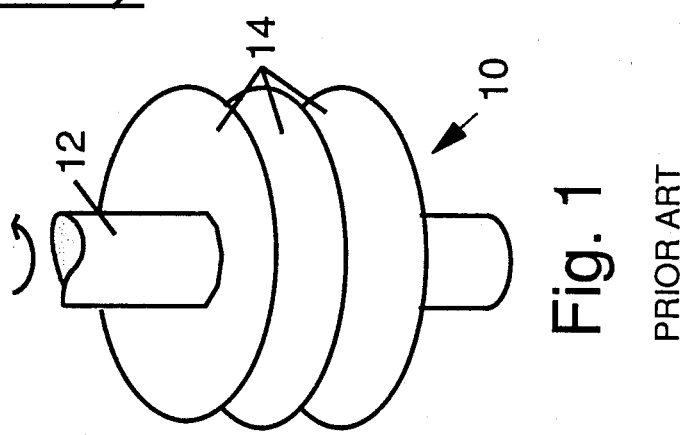

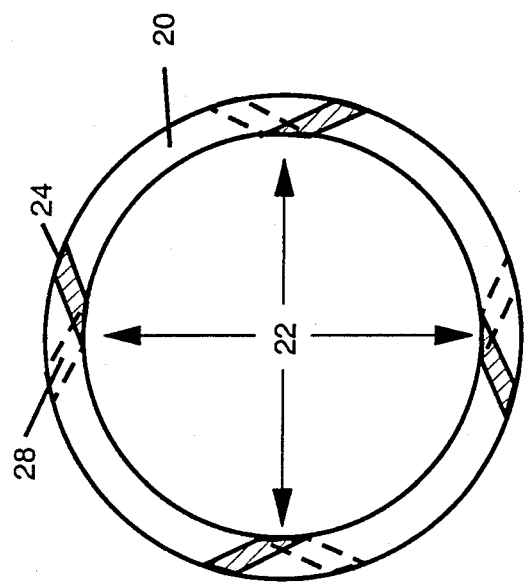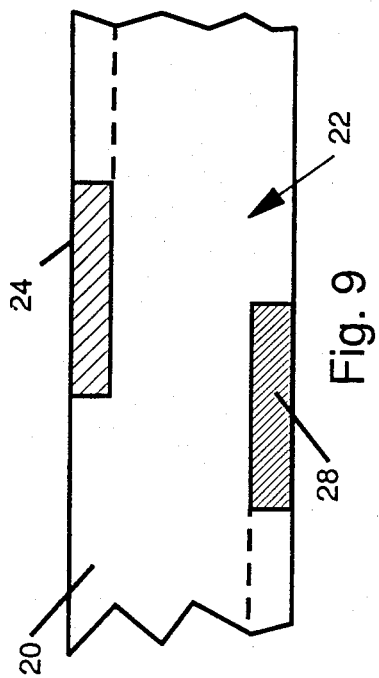

DISK SPACER RING HAVING AIR PUMPS

BACKGROUND OF THE INVENTION

1. Field of the Invention.

The invention relates generally to the field of multi-disk magnetic disk drives and more particularly to their disk spacer rings and means for venting the inner periphery of closely spaced disks.

2. Brief Description of the Prior Art.

Fixed multi-disk disk packs (FIG. 1) have their disks 14 so closely spaced (by spacer rings 20) that the viscosity of the air near the inner periphery of the closely spaced disks is sufficient to cause solid body rotation of the air upon rotation of the disks 14 (which are coupled to rotating spindle 12 by conventional hub clamps not shown). The solid body is indicated by reference 16 of FIGS. 2 and 3. Outward of this, disk rotation causes the disk surfaces to pump air outwards with increasing force towards their outer periphery. See the spiral arrows of FIG. 3. Absent another source of air to replace this outward flowing air, air from the periphery flows back in near the center of the space between adjacent disks. See the air flow arrows of FIG. 2. (Reference 18 in FIG. 2 represents the drive's disk casing.)

The presence of this solid body rotation causes many problems primarily because the air in the solid body does not mix with the air pumped beyond the disk's periphery. The air in the solid body cannot be filtered, and any debris present after manufacture or introduced later remains and can cause head crashes. The solid body air does not dissipate heat causing differential heating between the disk area in which the solid air body exist and the rest of the disk which is vented. This affects the ability of ganged heads of a system having just one servo surface to track the various disks surfaces.

To prevent solid body formation, the art has introduce vented spacer rings (20 of FIGS. 2 and 3) of many forms. The vents permit air from a vented air plenum within the spacer ring/disk stack (see the air plenum 17 in FIGS. 2 and 3) to communicate to the space between adjacent disks. This permits a continuous air flow from inner to outer disk periphery and prevents solid body rotation. See e.g., U.S. Pat. Nos. 3 969,767 (esp. FIG. 5), 4,562,499, 4,538,192, 4,363,056, and 4,317,146.

There are two drawbacks to this venting approach. One, an air plenum is required thereby not permitting disks and spacers to be mounted flush with the spindle. Such a mounting arrangement can lead to a decrease in the width of the disk pack. Second, the plenum must be vented, complicating spindle/hub design.

SUMMARY OF THE INVENTION

The invention comprises a disk spacer ring having a at least on pair of cooperating air (fluid) communicating channel so arranged that one scoops air in and the other and pumps it out. The air scooped by the scoop channel is pumped out the pump channel in a direction contrary to the direction of rotation of the disk surfaces, thereby preventing the formation of the solid body air rotation and causing intermixing of air near the inner disk periphery with that of the outer disk periphery.

In a preferred embodiment, the channels are on opposed flat surfaces of the spacer ring.

In one aspect of the invention, a flow-through channel is provided on the inner circumferential surface of the spacer ring connecting the scoop and pump channels. This flow-through channel permits the spacer ring to be mounted with its inner circumferential surface flush with another surface, such as a spindle.

BRIEF DESCRIPTION OF THE DRAWINGS

FIG. 1 is a perspective view of a plurality of disks mounted on a rotating spindle, comprising a disk pack.

FIG. 2 is a side cross sectional view of two disks separated by a spacer ring showing the air flow near the disks periphery and the area of solid body rotation.

FIG. 3. is top cross-sectional view of a disk pack showing a spacer ring, outer periphery air flow and solid body rotation.

FIG. 8 is a top plan view of a spacer ring according to a second embodiment of the present invention.

FIG. 9. is a back plan view of a portion of a spacer ring according to the second embodiment.

DESCRIPTION OF THE PREFERRED EMBODIMENTS

Figure 4:
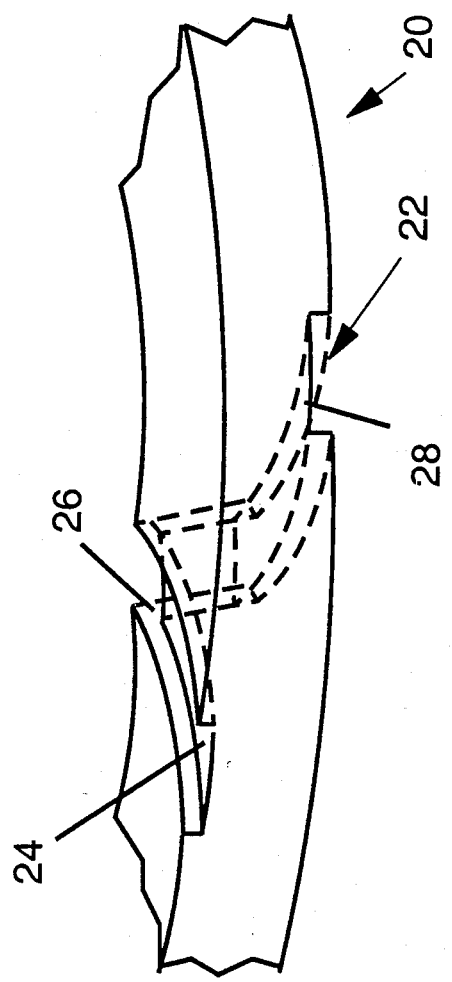
FIG. 4 is a partial perspective view of a spacer ring having a first, preferred pair of scoop-pump channel according to the present invention.

FIG. 4·is a partial perspective view of a disk pack spacer ring 20 having first, preferred embodiment of the present invention incorporated therein. A scoop-pump channel pair 22 comprises a first channel 24 formed in the top flat surface of spacer ring 20 and outwardly diverging in a first direction away from the spacer ring's radial; a second channel 28 formed on a bottom flat surface of the ring 20 outwardly diverging in a second direction away from the spacer rings's radial, the direction being opposite to the first direction of the first channel such that the radial approximately bisects the angle between the two directions; and a communicating channel 26 formed on the inner circumferential surface of the ring 20 connecting the first and second channels.

If the direction of rotation of the spacer ring 20 is to the right in the figure, the second, lower channel 28 scoops air in, and the first, top channel 24 pumps the scooped air out. If the direction of rotation is opposite, the reverse is true: channel 24 scoops and channel 28 pumps.

The two scoop/pump channels, 24 and 28, are preferably shaped identically. In this manner the scoop/pump performance is identical no matter which direction the ring 20 rotates. Therefore, if the ring 20 is somehow placed upside down between the two disks during manufacture (flip the figure to see the effect) so that channel 28 is on top and diverging to the left and channel 24 is on the bottom and diverging to the right, performance is unaffected. In this manner, their is no true top and bottom flat surface for the ring 20, and it can be mounted in the drive in either orientation and function identically. This is an important manufacturing feature where human error makes ring inversion probable.

In the figure, the scoop/pump channels 24/28 are shown slightly curved away from the radial. This improves both scoop and pump action, but is not an essential feature of the present invention. The channels could be straight, or flared at the ring's outer periphery. As well, the flowthrough channel 26 is slightly inclined in the direction of motion of air therethrough. This eases transit of the air between the two scoop/pump channels 28. However, a vertically straight channel will function and may be easier to manufacture.

The designer can choose among various shapes to optimize his specific application keeping in mind general principles of fluid turbine machinery.

Figure 5:
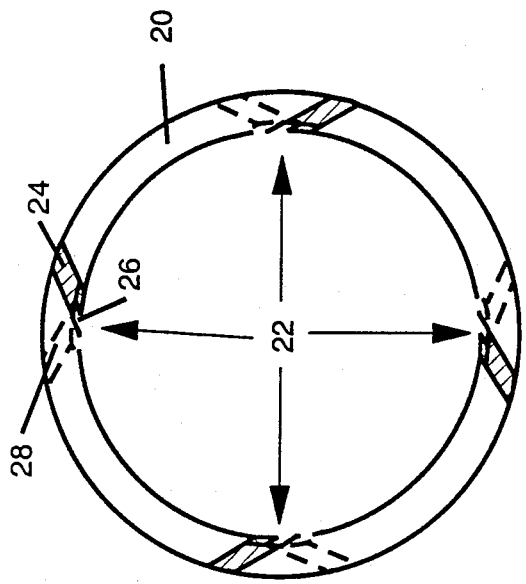
FIG. 5 is a top plan view of a spacer ring according to the preferred embodiment having four scoop-pump channel pairs.

FIG. 5 shows a complete spacer ring 20 having four equally spaced scoop/pump channel pairs 22 according to the first embodiment. With a conventional disk pack, if the distance between the openings of channels 24 and 28 at the outer periphery of the ring 20 is on the order of the distance between the ring and the outer boundary of the solid body rotation which occurs with solid spacer rings 20, then only four scoop/pumps are required. However, more or fewer may be required depending upon the disk spacing, ring size, and scoop/pump capacity.

Figure 6:
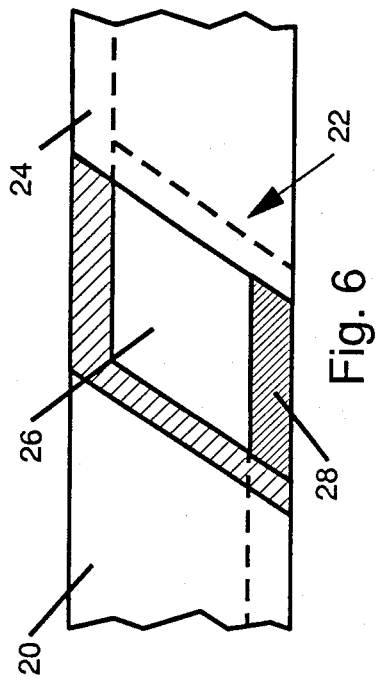
FIG. 6 is a back plan view of a portion of a spacer ring showing a flow-through channel connecting upper and lower channels of the scoop-pump pair.

FIG. 6 illustrates the flow through channel 26 of the first embodiment. This channel comprises a recess 26 cut or formed in the inner periphery of the ring 20 and connecting the first and second channels 24 and 28. The channel 22 communicates air between the scoop channel (assume 28) and the pump channel (assume 24). This channel permits scoop/pump operation even if the innner circumferential ring surface is flush against another surface, such as a spindle.

Figure 7:
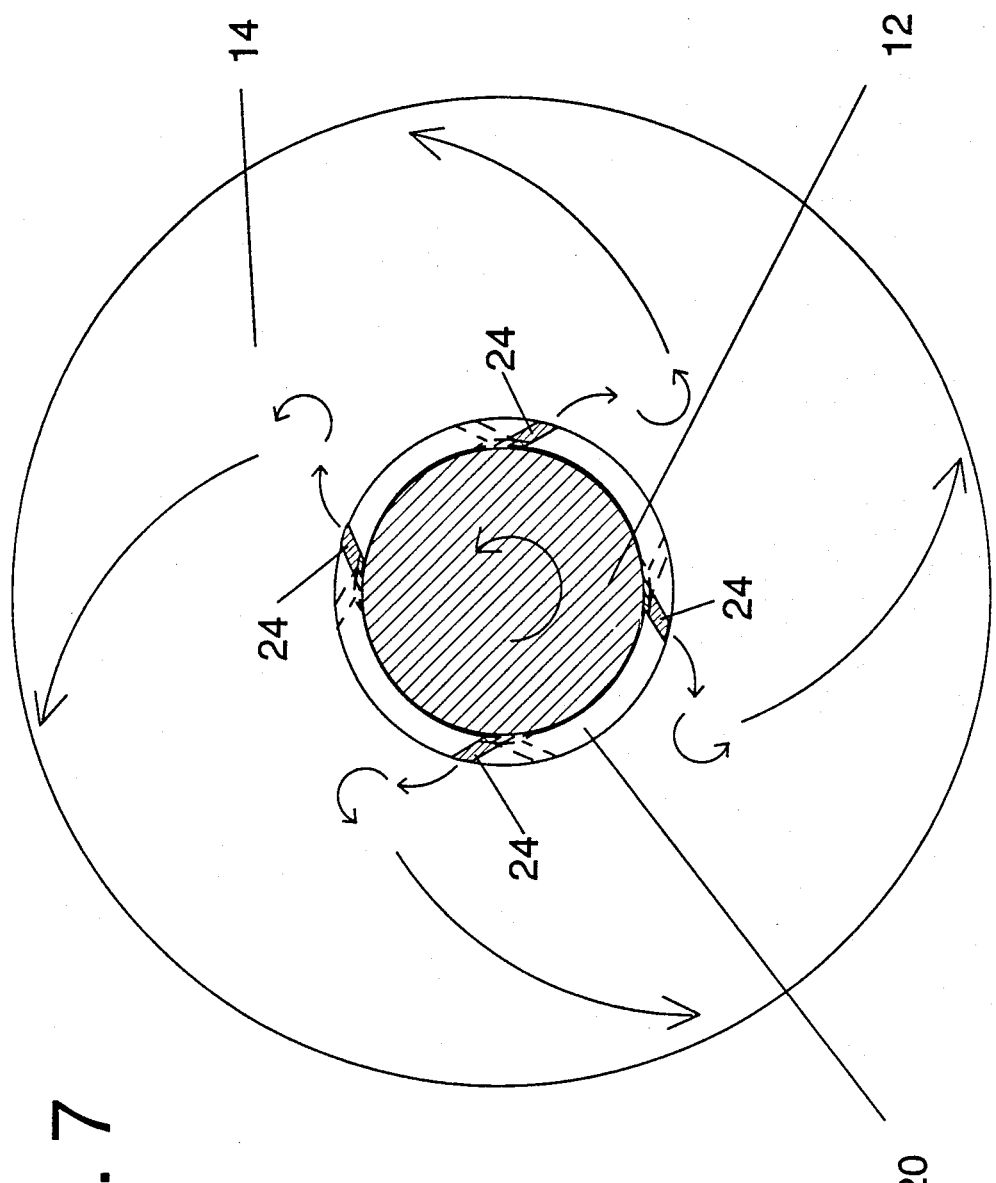
FIG. 7 is a view similar to that of FIG. 3 with the spacer ring of the present invention incorporated therein and showing the improved air-flow of the present invention.

FIG. 7 shows the spacer ring 20 of FIG. 5 mounted on flush on spindle 12 of the disk drive. Spindle rotation is indicated by the highly curved arrow thereon. In this arrangement, there is no air plenum interior the spacer ring to provide a source of air to communicate to the inner periphery of disk 14. Here air is scooped in by the second, lower channel 28 (see FIG. 4), flows through channel 26 (see FIG. 4), and is pumped out of the first, upper channel 24. Motion of the air on exit from the pump channel 24 is opposite to disk rotation and the direction of air flow towards the outer portions of the disk 14 as indicated by the large spiral arrows. Thus, the air flow reverses direction as shown by the sharply curved intemediated arrows and mixes in with the air blowing off the disk.

Air returns from the disk's outer periphery though the center of the space between the disks 14 substantially as illustrated in FIG. 2, however this time all the way to the spacer ring 20 where it i scooped in by scoop 28.

FIG. 8 illustrates a second embodiment of the invention wherein the scoop/pump channels 24 and 28 are straight and there is no flow-through channel. This embodiment is useful in those disk packs where an air plenum, vented or not, exists at the inner surface of the spacer ring. As can be seen from FIG. 9. the channels are slightly offset from one another in the direction of air flow, with air flowing between channels 28 and 24, the direction depending on which way the ring was rotating which of course depends upon which orientation it is mounted in the disk pack.

Figure 10:
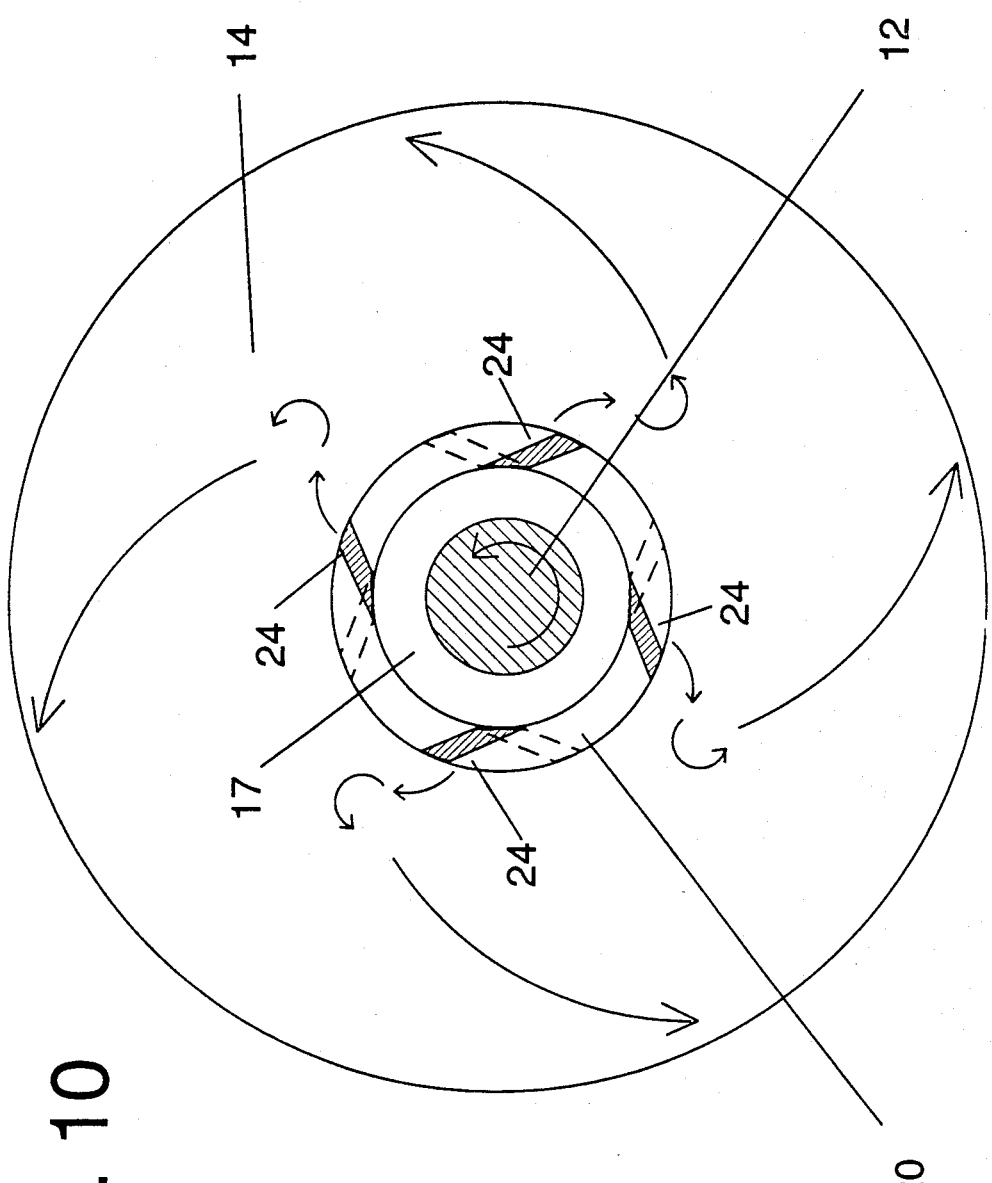
FIG. 10 is a view similar to that of FIG. 3 with the spacer ring according to the second embodiment of the present invention incorporated therein and showing the improved air-flow caused by the present invention.

FIG. 10 illustrates the spacer ring 20 according to the second embodiment mounted in a spaced arrangement from spindle 12 such as to form an air plenum 17 at the inner surface of ring 20. The air flow pattern is the same a that described in relation to FIG. 7, save that the air flowing between the scoop channel 28 (FIGS. 8 and 9) and the pump channel 24, flows in the plenum 17 and not in a flow-through channel.

Other arrangements of the elements of the present invention will occur to those skilled in the art. For example, locating both the scoop and pump channels on the same spacer ring flat surface.

I claim:

1. A disk spacer ring comprising:
   a spacer ring having formed thereon at least one pair of intercommunicating fluid communicating channels,
   a first channel outwardly diverging from one of the ring's radials in a first direction as the channel extends from a radially inner portion of the ring to an outer portion; and
   a second channel outwardly diverging from said radial in a second direction opposite the first direction as the second channel extends from a radially inner portion of the ring to an outer portion such that the radial approximately bisects the angle between the two directions;
   said first and second channels being in fluid communication with each other.

2. The spacer ring of claim 1 wherein said ring has a circumferential inner surface and said ring further includes a flow-through fluid communication channel formed on said inner surface connecting said first and said second channels.

3. The spacer ring of claim 1 wherein the ring has a pair of opposed, flat, parallel surfaces each in parallel with a plane passing through the ring, and wherein said pair of intercommunicating fluid communicating channels are disposed one upon one of said pair of opposed flat surfaces and the other upon the other of said opposed flat surfaces.

4. The spacer ring of claim 1 wherein the angle of divergence of each of the channels is the same such that the amount of fluid traversing through the intercommunicating pair of channels is independent of direction of rotation of the ring.

5. The spacer ring of claim 1 further including spindle means for causing said ring to rotate and wherein the channels are so arranged on said ring that one of said channels scoops fluid into it and the other of said channels pumps the scooped fluid of it.

6. The spacer ring of claim 1 wherein the number of pairs of intercommunicating fluid communicating channels is sufficient to prevent formation of solid body rotation fluid in the space between two of said disk pack disks spaced apart by said spacer ring.

* * * * *